United States Patent
Sano

(10) Patent No.: US 6,570,925 B1
(45) Date of Patent: May 27, 2003

(54) DIGITAL STILL CAMERA AND IMAGE DATA PROCESSOR

(75) Inventor: Chikako Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/371,102

(22) Filed: Aug. 10, 1999

(30) Foreign Application Priority Data

Aug. 12, 1998 (JP) .......................................... 10-228252

(51) Int. Cl.[7] .......................... H04N 7/12; H04N 11/02; H04N 11/04
(52) U.S. Cl. .................... 375/240.24; 348/663; 348/668
(58) Field of Search ................................ 348/663, 668; 375/240.24

(56) References Cited

U.S. PATENT DOCUMENTS

| | | | | |
|---|---|---|---|---|
| 4,575,749 A | * | 3/1986 | Acampora | 358/27 |
| 5,081,450 A | * | 1/1992 | Lucas | 340/728 |
| 5,671,319 A | * | 9/1997 | Ueda | 386/96 |
| 6,101,276 A | * | 8/2000 | Adiletta et al. | 382/236 |
| 6,151,069 A | * | 11/2000 | Dunton et al. | 348/220 |
| 6,256,347 B1 | * | 7/2001 | Yu et al. | 375/240.13 |
| 6,285,796 B1 | * | 7/2001 | Acharya | 382/246 |

* cited by examiner

*Primary Examiner*—Chris Kelley
*Assistant Examiner*—Charles Parsons
(74) *Attorney, Agent, or Firm*—Frommer Lawrence & Haug LLP; William S. Frommer; Dennis M. Smid

(57) ABSTRACT

The invention relates to an image data expansion processor for digital still camera. Two blocks of 8-bit luminance data and one block of 8-bit color difference data are repeatedly output from a compressing/expanding unit in the above order and are supplied to a buffer memory. Two blocks of 16-bit data to be written are generated corresponding to the two blocks of 8-bit luminance data and one block of 8-bit color difference data, are sequentially supplied from the buffer memory to a frame memory in units of block and are written to the frame memory. Each of luminance data and color difference data is not written to the frame memory in units of block but 16-bit data to be written composed of these luminance data and color difference data is written to the frame memory in units of block. The number of blocks written to the frame memory can be reduced and total time required for switching an address in the direction of lines can be reduced.

6 Claims, 15 Drawing Sheets

F I G. 1
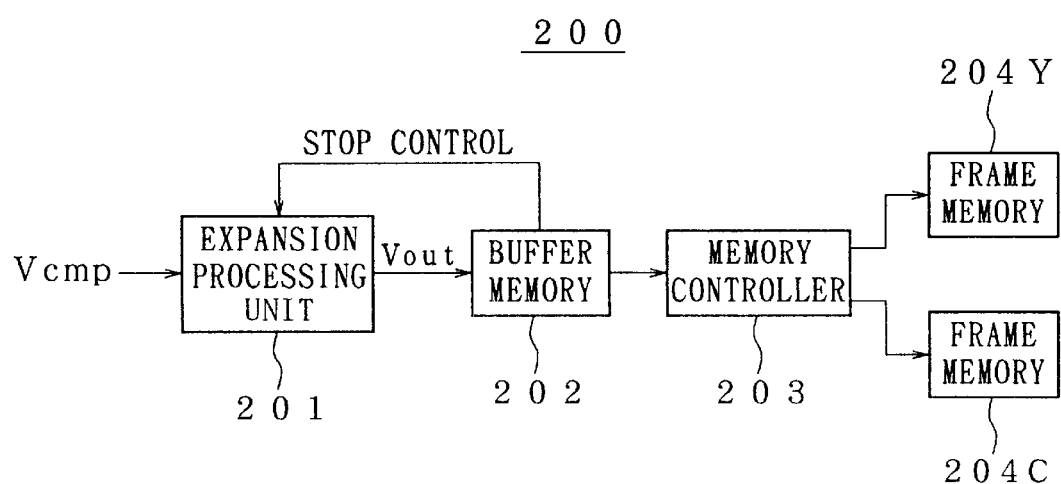

FIG. 2A (Y) 8 LINES

| | | | | | | | |
|---|---|---|---|---|---|---|---|
| $y_0$ | $y_1$ | $y_2$ | $y_3$ | $y_4$ | $y_5$ | $y_6$ | $y_7$ |
| $y_8$ | $y_9$ | $y_{10}$ | $y_{11}$ | $y_{12}$ | $y_{13}$ | $y_{14}$ | $y_{15}$ |
| $y_{16}$ | $y_{17}$ | $y_{18}$ | $y_{19}$ | $y_{20}$ | $y_{21}$ | $y_{22}$ | $y_{23}$ |
| $y_{24}$ | $y_{25}$ | $y_{26}$ | $y_{27}$ | $y_{28}$ | $y_{29}$ | $y_{30}$ | $y_{31}$ |
| $y_{32}$ | $y_{33}$ | $y_{34}$ | $y_{35}$ | $y_{36}$ | $y_{37}$ | $y_{38}$ | $y_{39}$ |
| $y_{40}$ | $y_{41}$ | $y_{42}$ | $y_{43}$ | $y_{44}$ | $y_{45}$ | $y_{46}$ | $y_{47}$ |
| $y_{48}$ | $y_{49}$ | $y_{50}$ | $y_{51}$ | $y_{52}$ | $y_{53}$ | $y_{54}$ | $y_{55}$ |
| $y_{56}$ | $y_{57}$ | $y_{58}$ | $y_{59}$ | $y_{60}$ | $y_{61}$ | $y_{62}$ | $y_{63}$ |

8 PIXELS

FIG. 2B (Cb) 8 LINES

| | | | |
|---|---|---|---|
| $b_0$ | $b_2$ | $b_4$ | $b_6$ |
| $b_8$ | $b_{10}$ | $b_{12}$ | $b_{14}$ |
| $b_{16}$ | $b_{18}$ | $b_{20}$ | $b_{22}$ |
| $b_{24}$ | $b_{26}$ | $b_{28}$ | $b_{30}$ |
| $b_{32}$ | $b_{34}$ | $b_{36}$ | $b_{38}$ |
| $b_{40}$ | $b_{42}$ | $b_{44}$ | $b_{46}$ |
| $b_{48}$ | $b_{50}$ | $b_{52}$ | $b_{54}$ |
| $b_{56}$ | $b_{58}$ | $b_{60}$ | $b_{62}$ |

4 PIXELS

FIG. 2C (Cr) 8 LINES

| | | | |
|---|---|---|---|
| $r_0$ | $r_2$ | $r_4$ | $r_6$ |
| $r_8$ | $r_{10}$ | $r_{12}$ | $r_{14}$ |
| $r_{16}$ | $r_{18}$ | $r_{20}$ | $r_{22}$ |
| $r_{24}$ | $r_{26}$ | $r_{28}$ | $r_{30}$ |
| $r_{32}$ | $r_{34}$ | $r_{36}$ | $r_{38}$ |
| $r_{40}$ | $r_{42}$ | $r_{44}$ | $r_{46}$ |
| $r_{48}$ | $r_{50}$ | $r_{52}$ | $r_{54}$ |
| $r_{56}$ | $r_{58}$ | $r_{60}$ | $r_{62}$ |

4 PIXELS

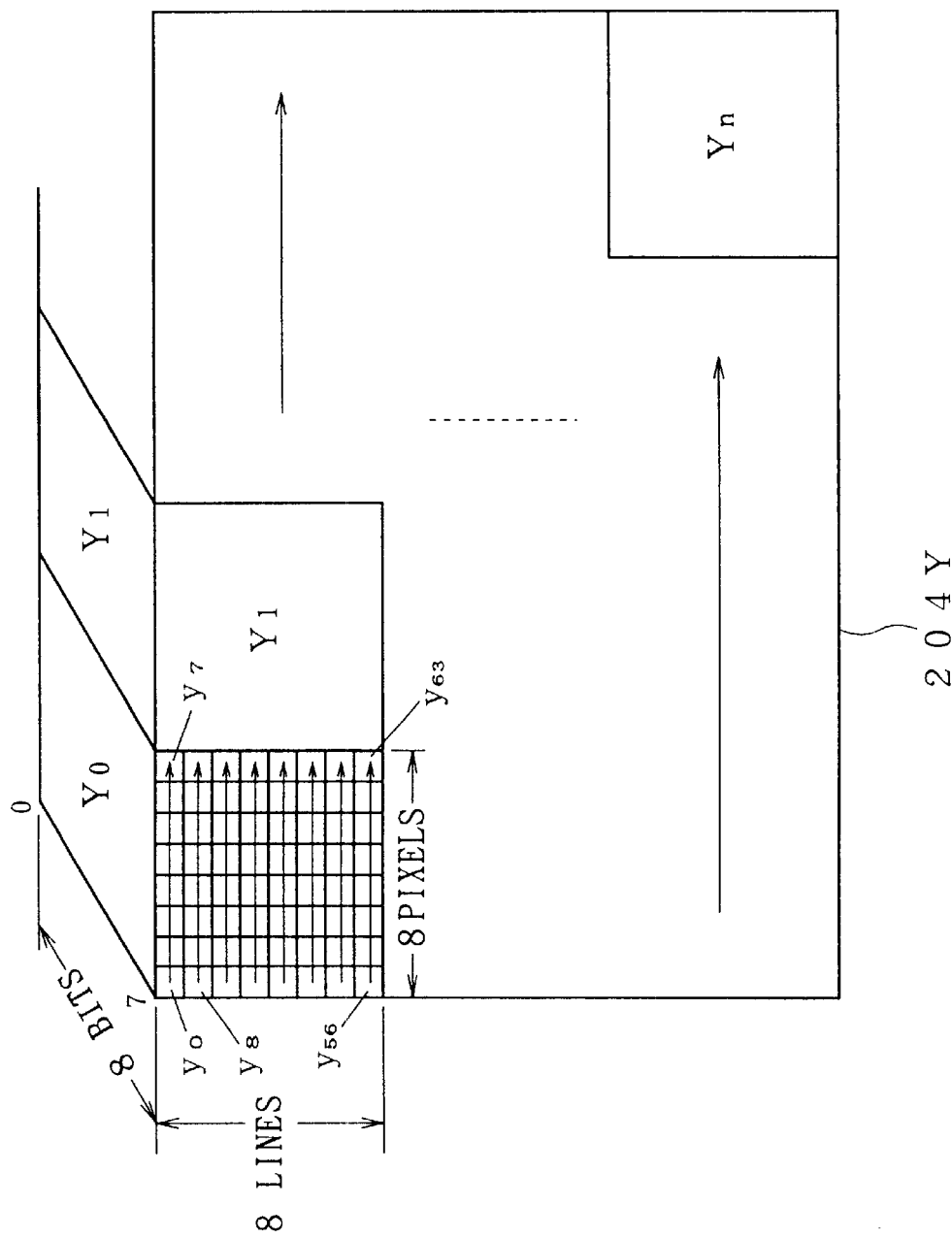

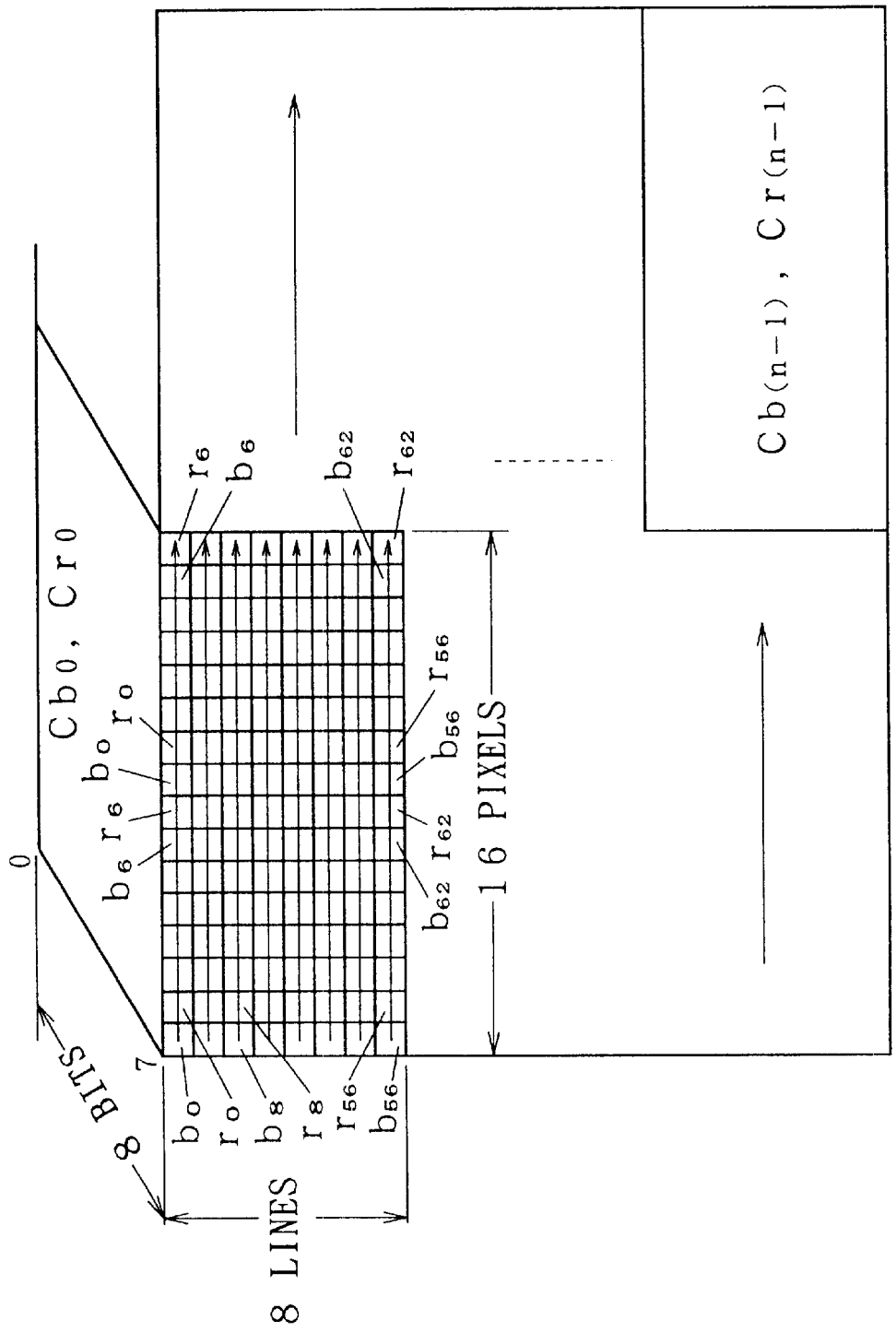

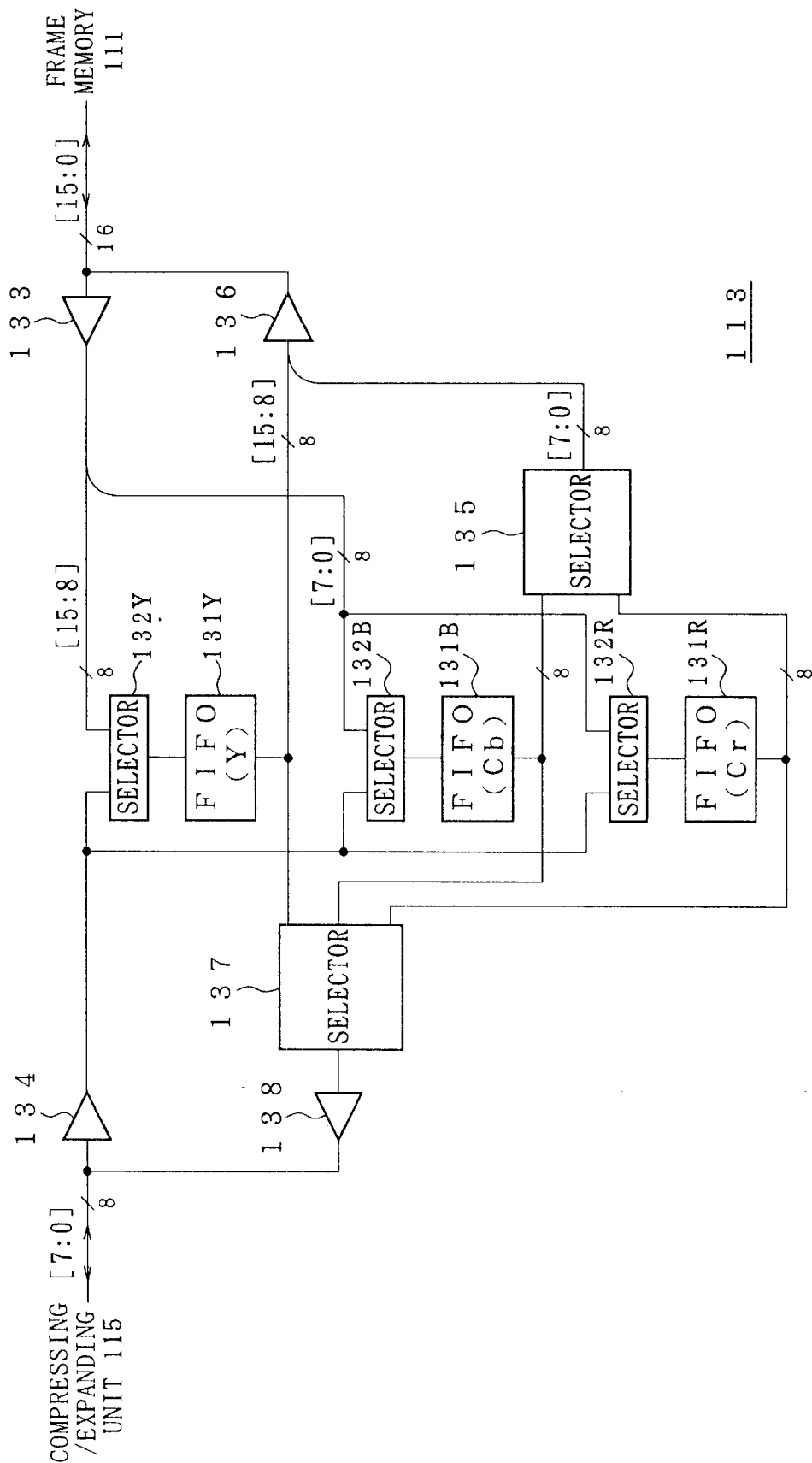

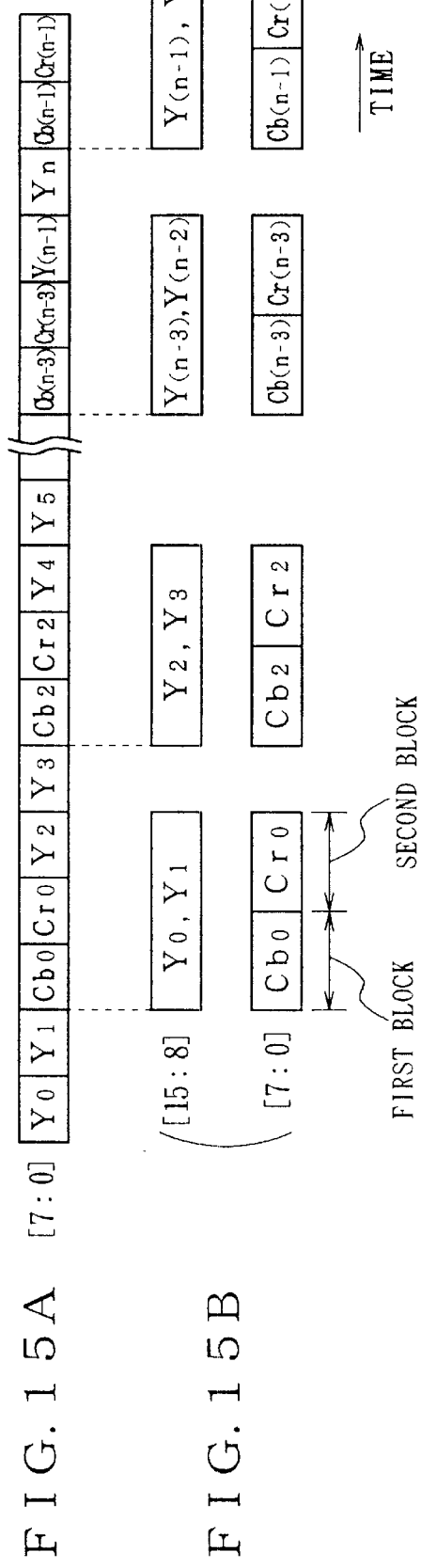

DIGITAL STILL CAMERA AND IMAGE DATA PROCESSOR

BACKGROUND OF THE INVENTION

1. Field of the Invention

The present invention relates generally to a digital still camera and an image data processor. More particularly, the present invention relates to a digital still camera that compresses a video signal acquired by photographing an object with a CCD imaging device, stores it in a storage element, reads said compressed video signal from the storage element and reproduces said video signal. Further, the present invention particularly relates to an image data processor wherein time required for image data expansion processing is reduced by generating luminance data and color difference data having a first data length and generating therefrom a block of data to be written composed of luminance data and color difference data having second data length equivalent to the double of the first data length, supplying these data to be written to a frame memory in units of block and writing the block of data to the frame memory.

2. Description of the Related Art

A digital still camera writes image data output from a large scale integrated circuit (LSI) for expansion to a frame memory when image data (luminance data and color difference data) compressed and stored after imaging is reproduced.

FIG. 1 shows a configuration of an image data expansion processor 200 used in the conventional digital still camera. The processor 200 is composed of an expansion processing unit (LSI for expansion) 201 for performing data expansion processing on compressed image data Vcmp which is a reproduced data from a PC card and others, a buffer memory 202 for temporarily storing an image data Vout output from the expansion processing unit 201, a frame memory 204Y for storing a luminance data Y of the image data Vout, a frame memory 204C for storing a blue color difference data Cb and a red color difference data Cr of the image data Vout and a memory controller 203 for reading the image data Vout from the buffer memory 202 and sequentially writing it to the frame memories 204Y and 204C.

The expansion processing unit 201 outputs the luminance data Y, the blue color difference data Cb and the red color difference data Cr. They respectively have 8-bit data length and are sequentially output in units of block composed of "eight pixels×8 lines" as the image data Vout.

The luminance data Y, the blue color difference data Cb and the red color difference data Cr correspond to a video signal in "4 to 2 to 2" mode. In the case of the "4 to 2 to 2" mode, these color difference data Cb and Cr respectively include a half of the information of luminance data Y. That is, in the case of the "4 to 2 to 2" mode, these color difference data Cb and Cr are composed of "4 pixels×8 lines" shown in FIGS. 2B and 2C while the luminance data Y is composed of "8 pixels×8 lines" shown in FIG. 2A.

Therefore, the expansion processing unit 201 outputs two blocks of luminance data Y, one block of blue color difference data Cb and one block of red color difference data Cr repeatedly in the above order, as shown in FIG. 3A. In this case, the color difference data Cb and Cr are respectively composed of "8 pixels×8 lines" as one block. Therefore, they have an area corresponding to two blocks of luminance data Y. The respective pixel data b0, b2, b4, - - - , r0, r2, r4, - - - of the color difference data Cb and Cr shown in FIGS. 2B and 2C are data in the same position as the pixel data y0, y2, y4, - - - of the luminance data Y shown in FIG. 2A.

As described above, the luminance data Y, the color difference data Cb and Cr sequentially output from the expansion processing unit 201 as image data Vout are sequentially stored in the frame memories 204Y and 204C under the control of the memory controller 203 as shown in FIG. 3B after the above data is temporarily stored in the buffer memory 202.

If the luminance data Y is illustratively stored in the frame memory 204Y, an address (RAS address) in the direction of lines is switched every 8 pieces of pixel data as shown in FIG. 4 and pixel data is written as to 64 pieces of pixel data, y0 to y63 constituting the luminance data Y0, Y1, Y2, Y3, - - - of each block. Therefore, as shown in FIG. 3C, time, Tad, for switching an address is required every time 8 pieces of pixel data are written. As a result, time required for writing pixel data for one block in the frame memory 204Y is longer than the time required for outputting the pixel data y0 to y63 of one block from the expansion processing unit 201.

Also, if the color difference data Cb and Cr are illustratively stored in the frame memory 204C, an address (RAS address) in the direction of lines is switched every 8 pieces of pixel data as shown in FIG. 5 and pixel data are written as to 64 pieces of pixel data constituting the color difference data Cb0, Cr0, Cb2, Cr2, - - - of each block. In this case, the blue color difference data Cb0, Cb2, - - - are written to the even addresses of each line as "b0, b2, b4, b6, b0, b2, b4, b6", "b8, b10, b12, b14, b8, b10, b12, b14", - - - and the red color difference data Cr0, Cr2, - - - are written to the odd addresses of each line as "r0, r2, r4, r6, r0, r2, r4, r6", "r8, r10, r12, r14, r8, 10, r12, r14", - - - .

As described above, if the color difference data Cb and Cr are stored in the frame memory 204C, the time, Tad, for switching an address is also required every time 8 pieces of pixel data are written. As a result, time required for writing one block of pixel data to the frame memory 204C is longer than time required for outputting one block of pixel data from the expansion processing unit 201.

In the conventional digital still camera, to adjust difference between time required for writing the above one block of pixel data to the frame memories 204Y and 204C and time required for outputting one block of pixel data from the expansion processing unit 201, the processing of the expansion processing unit 201 stops every time the image data Vout of one block is output (see a period Tst in which expansion processing is stopped shown in FIG. 3A) and, at the next block, the pixel data is written to the frame memories 204Y and 204C at the same timing as the output timing of the expansion processing unit 201 has been executed.

Similarly, in the conventional image data processor 200, writing image data, Vout, to the frame memories 204Y and 204C takes much time and to adjust time, a measure of stopping the processing of the expansion processing unit 201 has been taken. Therefore, there has been a problem that it takes relatively much time to execute processing for expanding image data.

SUMMARY OF THE INVENTION

The object of the present invention is to provide a digital still camera and an image data processor wherein time required for expanding image data is reduced.

In carrying out the present invention as one preferred embodiment, I provide a digital still camera that compresses a video signal acquired by photographing an object with a CCD imaging device, stores it in a storage element, reads said compressed video signal from the storage element and reproduces said video signal. The digital still camera comprises expansion processing means for performing expansion processing on said compressed video signal and outputting the video signal in units of block as luminance data and color difference data respectively having a first data length, a frame memory having a second data length equivalent to the double of the first data length, video data block generating means for generating a block of video data having the second data length by connecting the luminance data and the color difference data respectively having the first data length and output from the expansion processing means in units of block, and writing means for writing a signal output from the video data block generating means to the frame memory in units of block of said video data.

Further, as another preferred embodiment, I provide an image data processor comprising an expansion processing means for expanding a compressed video signal as luminance data and color difference data respectively having a first data length and sequentially outputting the expanded video data in units of block, a frame memory having a second data length equivalent to the double of the first data length and data writing means for generating a block of data to be written having the second data length and writing the data to be written to the frame memory in units of block, the data to be written comprising the luminance data and the color difference data respectively having the first data length and output from the expansion processing means.

According to the present invention, compressed image data (for example, image data compressed according to Joint Photographic Experts Group (JPEG) method) is expanded in the expansion processing means. The luminance data and the color difference data respectively having first data length (for example, 8-bit data length) are sequentially output in units of block from the expansion processing means. Then, a block of data to be written having second data length (for example, 16-bit data length) is generated from the luminance data and the color difference data. For example, 8-bit luminance data is allocated on the side of high order bits and 8-bit color difference data is allocated on the side of low order bits so that a block of 16-bit data to be written is generated.

The data to be written generated as described above having second data length is written to the frame memory having second data length in units of block. In this case, when a block is composed of "8 pixels×8 lines", an address in the direction of lines is switched every 8 pieces of pixel data and the data is written.

Therefore, time for switching an address is required and then time for stopping the processing of the expansion processing means is required to adjust time. However, in the present invention, each of luminance data and color difference data respectively having first data length is not written in the frame memory in units of block but data to be written having second data length and composed of the luminance data and the color difference data is written to the frame memory in units of block.

Therefore, as the number of blocks written to the frame memory decreases, total time required for switching an address also decreases. Hereby, a period that the processing of the expansion processing means stops to adjust time can be also reduced and time required for expanding image data can be reduced.

A further understanding of the nature and advantages of the invention may be realized by reference to the following portions of the specification and drawings.

BRIEF DESCRIPTION OF THE DRAWINGS

FIG. 1 is a block diagram showing the configuration of a conventional image data processor;

FIGS. 2A to 2C are views each for explaining a video signal in "4 to 2 to 2" mode;

FIG. 4 is a view for showing the order of writing to a frame memory (for luminance data);

FIG. 5 is a view for showing the order of writing to a frame memory (for chromatic data);

FIG. 7 is a block diagram showing the configuration of a buffer memory;

FIGS. 15A and 15B are views for explaining processing for writing to a frame memory in a fifth embodiment.

DESCRIPTION OF THE PREFERRED EMBODIMENTS

Figures 3A, 3B, 3C:
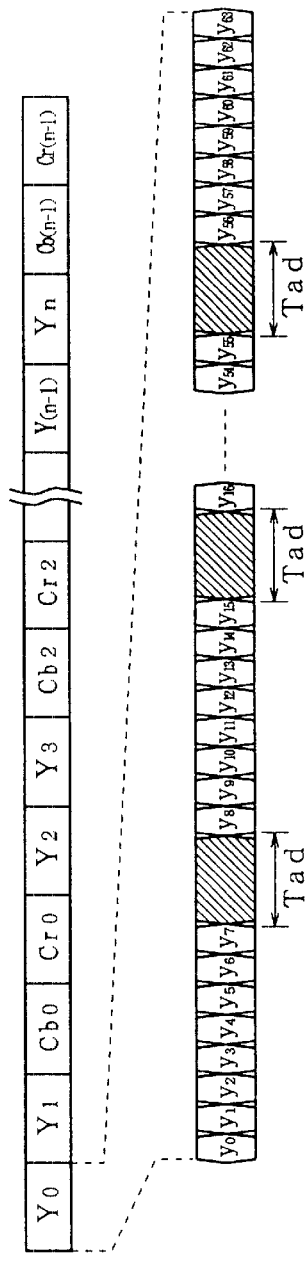
FIGS. 3A to 3C are views for explaining processing for writing to a frame memory.
Figure 6:
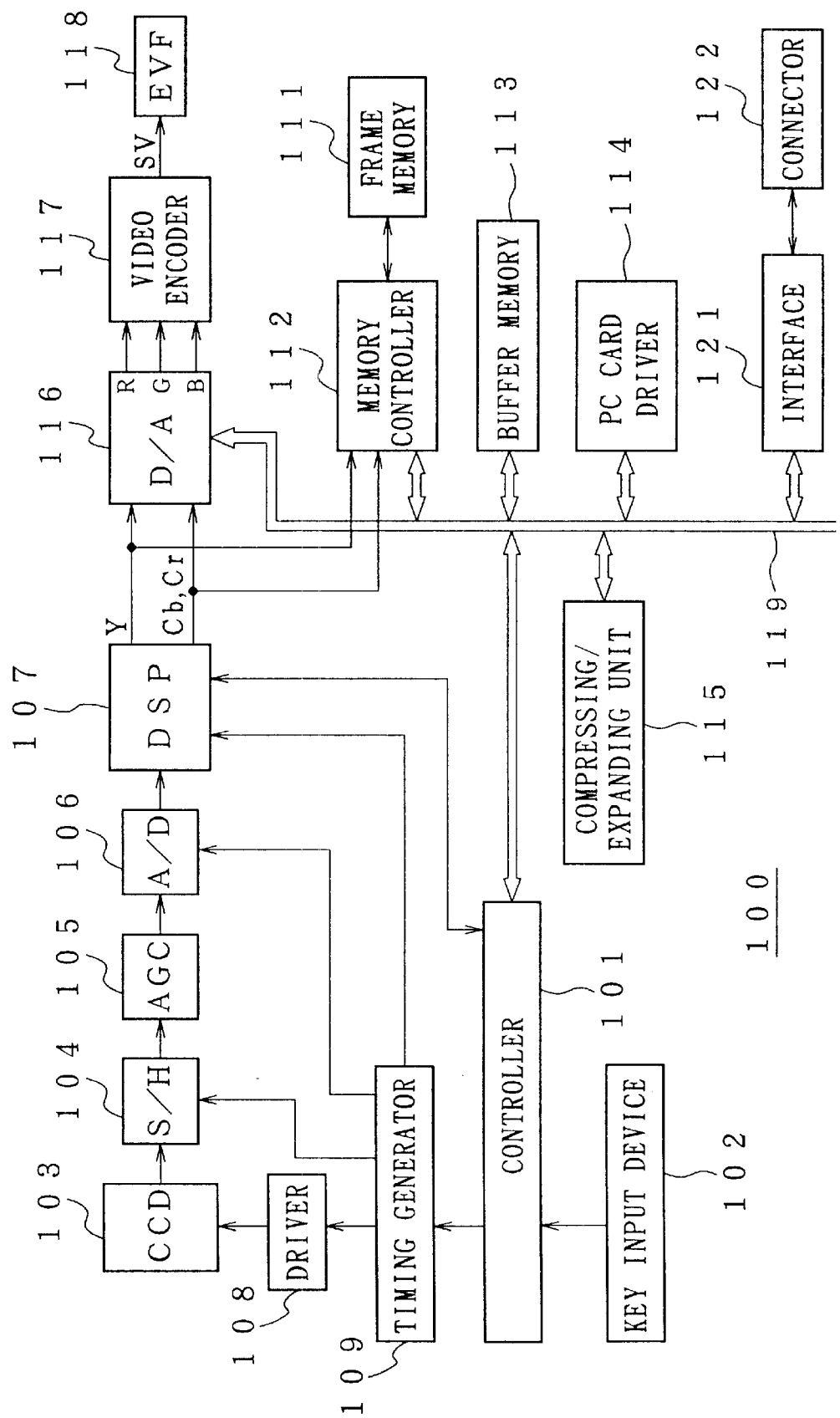
FIG. 6 is a block diagram showing the configuration of a digital still camera equivalent to a first embodiment.

Referring to the drawings, preferred embodiments of the present invention will be described below. FIG. 6 shows the configuration of the a digital still camera 100 equivalent to a first embodiment.

The above still camera 100 is provided with a microcomputer and a controller 101 for controlling the operation of the whole system. A key input device 102 for a user to perform various key operation such as an instruction to fetch a still picture is connected to the controller 101.

The still camera 100 is also provided with a charge coupled device (CCD) solid-state imaging device 103 as an imaging device; a sample-hold circuit 104 for removing an unnecessary reset signal output from the imaging device 103; an automatic gain control (AGC) circuit 105 for controlling so that the amplitude of an imaging signal output from the sample-hold circuit 104 is kept fixed; an analog-to-digital (A/D) converter 106 for converting an imaging signal from an analog signal to a digital signal, the amplitude of which is controlled by the AGC circuit 105; and a digital signal processor (DSP) 107 for processing imaging data output from the A/D converter 106 to acquire luminance data Y, blue color difference data Cb and red color difference data Cr.

a driver 108 drives the imaging device 103. A reading gate pulse, a transfer pulse and others required for driving the imaging device 103 are supplied to the driver 108 by a timing generator 109. The timing generator 109 supplies a timing signal required for each operation to the sample-hold circuit 104, the A/D converter 106 and DSP 107.

The luminance data Y, the blue color difference data Cb and the red color difference data Cr respectively acquired by DSP 107 correspond to a video signal in "4 to 2 to 2" mode as shown in FIGS. 2A to 2C.

The digital still camera 100 is also provided with a frame memory 111 for storing the luminance data Y, the blue color difference data Cb and the red color difference data Cr; a memory controller 112 for controlling the operation such as writing and reading to/from the frame memory 111; a buffer memory 113 for storing temporarily storing the luminance data Y, the blue color difference data Cb and the red color difference data Cr; and a PC card driver 114 for recording compressed image data in a PC card and reproducing the compressed image data in the PC card. The luminance data Y and these color difference data Cb and Cr have 8-bit data length, while the frame memory 111 has 16-bit data length.

The digital still camera 100 is also provided with a compressing/expanding unit 115 for performing compression processing on the luminance data Y and these color difference data Cb and Cr respectively stored in the frame memory 111 according to JPEG method in recording so as to acquire compressed image data to be recorded in the PC card, and performing expansion processing on the compressed image data reproduced from the PC card in reproducing so as to acquire the luminance data Y and these color difference data Cb and Cr; and an interface 121 for transferring photographed image data to an external computer and a monitor. A connector 122 for connecting to external equipment is connected to the interface 121.

The digital still camera 100 is also provided with a D/A converter 116 for performing an RGB encoding processing and a digital-to-analog conversion processing on the luminance data Y and these color difference data Cb and Cr respectively supplied from DSP 107 or the luminance data Y and these color difference data Cb and Cr respectively read and supplied from the frame memory 111 by the memory controller 112; a video encoder 117 for acquiring a video signal SV, for example, according to a National Television System Committee (NTSC) method using chrominance signals of red (R), green (G) and blue (B) output from the D/A converter 116; and an electronic view finder 118 for displaying an image based upon the video signal SV.

The controller 101, the memory controller 112, the buffer memory 113, the PC card driver 114, the compressing/expanding unit 115, the D/A converter 116 and the interface 121 are connected to a bus 119 composed of a signal conductor and a control line.

FIG. 7 shows the concrete configuration of the buffer memory 113. The buffer memory 113 provides a buffer function when the luminance data Y and the color difference data Cb and Cr are supplied from the frame memory 111 to the compressing/expanding unit 115 and a buffer function when the luminance data Y and the color difference data Cb and Cr are supplied from the compressing/expanding unit 115 to the frame memory 111.

The buffer memory 113 is provided with a first-in first-out (FIFO) memory 131Y in which two blocks of luminance data Y can be stored, a FIFO memory 131B in which one block of blue color difference data Cb can be stored and a FIFO memory 131R in which one block of red color difference data Cr can be stored. The FIFO memories 131Y, 131B and 131R have 8-bit data length and function as a buffer memory. One block is composed of 64 pieces of pixels (8 pixels×8 lines).

The buffer memory 113 is also provided with a selector 132Y for selectively extracting high order 8-bit (a bit 8 to a bit 15) data (luminance data Y) supplied via a buffer amplifier 133 out of 16-bit data output from the frame memory 111 or 8-bit luminance data Y supplied from the compressing/expanding unit 115 via a buffer amplifier 134, and supplying the above data to the memory 131Y as input data.

The buffer memory 113 is also provided with selectors 132B and 132R each for selectively extracting low order 8-bit (a bit 0 to a bit 7) data (color difference data Cb or Cr) supplied via the buffer amplifier 133 out of 16-bit data output from the frame memory 111 or 8-bit color difference data Cb and Cr supplied from the compressing/expanding unit 115 via the buffer amplifier 134, and supplying the above data to the memories 131B and 131R as input data.

The buffer memory 113 is also provided with a selector 135 for selectively extracting 8-bit data (blue color difference data Cb) as output data from the memory 131B or 8-bit data (red color difference data Cr) as output data from the memory 131R, and a buffer amplifier 136 for supplying the 8-bit data (luminance data Y) as output data from the memory 131Y as an upper order 8-bit data to the frame memory 111 and supplying the 8-bit data (color difference data Cb or Cr) extracted by the selector 135 as a low order 8-bit data to the frame memory 111.

The buffer memory 113 is also provided with a selector 137 for selectively extracting a 8-bit data (luminance data Y) as output data from the memory 131Y, a 8-bit data (blue color difference data Cb) as output data from the memory 131B or a 8-bit data (red color difference data Cr) as output data from the memory 131R, and a buffer amplifier 138 for supplying the data extracted by the selector 137 to the compressing/expanding unit 115.

The operation of the buffer memory 113 shown in FIG. 7 will be briefly described.

First, when the luminance data Y and the color difference data Cb, Cr are supplied from the frame memory 111 to the compressing/expanding unit 115, the buffer memory 113 executes the following operation.

The frame memory 111 sequentially supplies each block of data to the buffer memory 113. Each block of data is composed of 64 pieces (8 pixels×8 lines) of pixel data. Each pixel data is 16-bit data and is composed of the luminance data Y existing in high order 8 bits and the color difference data Cb, Cb existing in low order 8 bits. In this case, the blue color difference data Cb and the red color difference data Cr are alternately allocated to lower order 8 bits in the pixel data.

Luminance data Y existing in high order 8 bits out of 16-bit data supplied from the frame memory 111 is extracted by the selector 132Y, is supplied to the memory 131Y and is written to it. Color difference data Cb and Cr existing in low order 8 bits out of 16-bit data supplied from the frame memory 111 are respectively extracted by the selectors 132B and 132R, are respectively supplied to the memories 131B and 131R and are respectively written to them.

Every time two blocks of luminance data Y are written to the memory 131Y and one block of color difference data Cb and Cr are respectively written to the memories 131B and 131R, first, the two blocks of luminance data Y are read from the memory 131Y and extracted by the selector 137; next, the one block of blue color difference data Cb is read from the memory 131B and extracted by the selector 137; further, the one block of red color difference data Cr is read from the memory 131R and extracted by the selector 137. The two blocks of luminance data Y and the one block of color difference data Cb, Cr respectively extracted by the selector 137 are supplied to the compressing/expanding unit 115 via the buffer amplifier 138.

Next, the operation of the buffer memory 113 executed when the luminance data Y and the color difference data Cb and Cr are supplied from the compressing/expanding unit 115 to frame memory 111 will be described.

The compressing/expanding unit 115 sequentially supplies two blocks of the 8-bit luminance data Y, oneblock of 8-bit blue color difference data Cb and one block of 8-bit red color difference data Cr repeatedly in the above order. Each block is composed of 64 pieces (8 pixels×8 lines) of pixel data. The luminance data Y is extracted by the selector 132Y and is written to the memory 131Y. Similarly, the color difference data Cb, Cr are respectively extracted by the selectors 132B and 132R and are respectively written to the memories 131B and 131R.

Luminance data Y is read by one block from the memory 131Y. In this case, 64 pieces of pixel data y0 to y63 constituting each block are read in the order of y0 to y7, y8 to y15, - - - , y56 to y63 (see FIG. 2A).

The color difference data Cb, Cr are read from the memories 131B and 131R corresponding to the above reading of the luminance data Y. That is, when one block of the luminance data Y is read, a half block of the color difference data Cb, Cr corresponding to the one block of luminance data Y are read. The luminance data Y is read in the order of y0 to y7, y8 to y15, - - - , y56 to y63 from the memory 131Y, while 32 pieces of pixel data b0 to b62 are read in the order of b0 to b6, b8 to b14, - - - , b56 to b62 from the memory 131B and 32 pieces of pixel data r0 to r62 are read in the order of r0 to r6, r8 to r14, - - - , r56 to r62 from the memory 131R (see FIGS. 2B and 2C).

When even ordinal of pixel data y0, y2, y4, y6, y8, y10, y12, y14, - - - , y56, y58, y60 and y62 are read from the memory 131Y, the selector 135 extracts pixel data b0, b2, b4, b6, b8, b10, b12, b14, - - - , b56, b58, b60 and b62 read from the memory 131B.

When odd ordinal of pixel data y1, y3, y5, y7, y9, y11, y13, y15, - - - , y57, y59, y61 and y63 are read from the memory 131Y, the selector 135 extracts pixel data r0, r2, r4, r6, r8, r10, r12, r14, - - - , r56, r58, r60 and r62 read from the memory 131R.

Eight-bit luminance data Y read from the memory 131Y is allocated to high order 8 bits and 8-bit data (color difference data Cb and Cr) extracted by the selector 135 are allocated to low order 8 bits so that 16-bit data is generated. Said 16-bit data is supplied to the frame memory 111 via the buffer amplifier 136.

In this case, 16-bit data to be written for two blocks are generated corresponding to two blocks of luminance data Y and one block of the color difference data Cb, Cr respectively supplied from the compressing/expanding unit 115 and is supplied to the frame memory 111 in units of block. Each block of data is composed of 64 pieces (8 pixels×8 lines) of pixel data and each pixel data is composed of luminance data Y existing in high order 8 bits and the color difference data Cb, Cr alternately existing in low order 8 bits.

The operation of the digital still camera 100 shown in FIG. 6 will be described below.

First, the operation of the digital still camera 100 in a state waiting for an instruction to fetch a still picture from a user via the key input device 102 will be described.

An unnecessary rest signal of an imaging signal output from the imaging device 103 is removed in the sample-hold circuit 104 and afterward, said imaging signal is supplied to DSP 107 via the AGC circuit 105 and the A/D converter 106.

In DSP 107, the imaging signal is processed, and the luminance data Y, the blue color difference data Cb and the red color difference data Cr are acquired corresponding to a video signal in "4 to 2 to 2" mode. In this case, the blue color difference data Cb and the red color difference data Cr are dot-sequentially output.

The luminance data Y and the color difference data Cb, Cr respectively output from DSP 107 are supplied to the D/A converter 116 wherein RGB encoding processing and digital-to-analog conversion processing are applied to the above data. The video encoder 117 generates a video signal SV, for example, according to NTSC method, based upon chrominance signals of R, G and B as an analog signal output from the D/A converter 116. An image based upon the video signal SV is displayed on the electronic view finder 118. Hereby, a user can monitor the screen of the electronic view finder 118.

Next, the operation of the digital still camera when a user gives an instruction to fetch a still picture by operating the key input device 102 will be described.

When an instruction to fetch a still picture is given, one frame of luminance data Y and one frame of color difference data Cb, Cr respectively output from DSP 107 at the timing are supplied to the frame memory 111 via the memory controller 112 and are sequentially written to the frame memory 111. As described above, the frame memory 111 has 16-bit data length, the luminance data Y is written to high order 8 bits and the color difference data Cb and Cr are written to low order 8 bits respectively by controlling its writing address so that each data is written to a suitable address. In this case, the blue color difference data Cb and the red color difference data Cr are alternately written to the low order 8 bits.

After one frame of luminance data Y and one frame of color difference data Cb and Cr are written to the frame memory 111, these luminance data Y and color difference data Cb and Cr are supplied to the compressing/expanding unit 115 via the buffer memory 113 in units of block. A compressed image data is generated by compression processing according to JPEG method.

In this case, as described above, each block of data is sequentially supplied from the frame memory 111 to the buffer memory 113. Each block of data is composed of 64 pieces (8 pixels×8 lines) of pixel data. Each pixel data is 16-bit data and is composed of the luminance data Y existing in high order 8 bits and the color difference data Cb and Cb existing in low order 8 bits. In the buffer memory 113, the luminance data Y and the color difference data Cb and Cr are separated, and two blocks of luminance data Y and one block of color difference data Cb, Cr are repeatedly supplied in the above order from the buffer memory 113 to the compressing/expanding unit 115.

One frame of the compressed image data generated in the compressing/expanding unit 115 is supplied to the PC card driver 114 and is recorded in the PC card, not shown.

Next, the operation of the digital still camera when a user gives an instruction to reproduce by operating the key input device 102 will be described.

When an instruction to reproduce is given, the PC card driver 114 executes operation to reproduce data in the PC card under control by the controller 101, the reproduced one frame of compressed image data is supplied to the compressing/expanding unit 115 and expansion processing is applied to it. Two blocks of the luminance data Y and one block of the color difference data Cb, Cr are repeatedly output from the compressing/expanding unit 115 in the above order. One frame of luminance data Y and one frame of color difference data Cb, Cr respectively output from the compressing/expanding unit 115 are supplied to the frame memory 111 via the buffer memory 113 and are sequentially written in the frame memory 111.

In this case, as described above, the buffer memory 113 generates two blocks of data to be written corresponding to two blocks of the luminance data Y and one block of the color difference data Cb, Cr from the compressing/expanding unit 115. The buffer memory 113 supplies the generated data to the frame memory 111 in units of block. Each block of data is composed of 64 pieces (8 pixels×8 lines) of pixel data and each pixel data is composed of the luminance data Y existing in high order 8 bits and the color difference data Cb, Cr alternately existing in low order 8 bits.

Figures 8A, 8B, 8C:
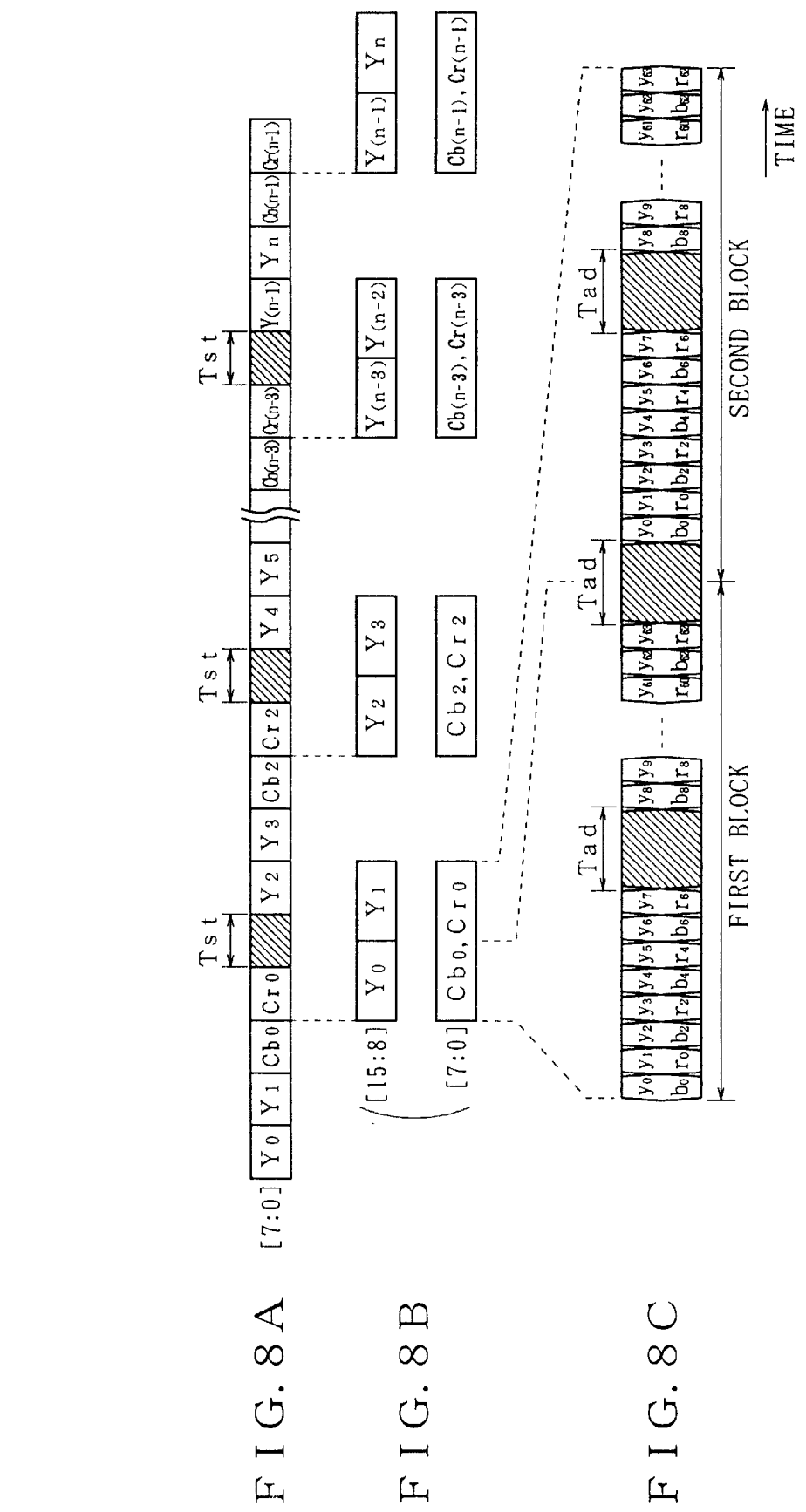
FIGS. 8A to 8C are views for explaining processing for writing to a frame memory.

FIG. 8A shows the luminance data Y and the color difference data Cb and Cr respectively output from the compressing/expanding unit 115 and supplied to the buffer memory 113.

"Y0, Y1, Y2, Y3, - - - " respectively denote one block of the luminance data Y. "Cb0, Cb2, - - - " respectively denote one block of the blue color difference data Cb. "Cr0, Cr2, - - - " respectively denote one block of the red color difference data Cr. Each block of data of the luminance data Y and the color difference data Cb, Cr is composed of 64 pieces (8 pixels×8 line) of pixel data. The pixel data for one block of the color difference data Cb, Cr corresponds to the area of two blocks of the luminance data Y.

FIGS. 8B and 8C show data to be written supplied from the buffer memory 113 to the frame memory 111. As described above, two blocks of data to be written are generated corresponding to two blocks of the luminance data Y and one block of the color difference data Cb, Cr. For example, corresponding to the luminance data Y0, Y1 and the color difference data Cb0, Cr0, two blocks of data to be written are generated as follows.

As for 64 pieces (8 pixels×8 lines) of pixel data constituting a first block of data to be written, the pixel data y0, y1, y2, y3, y4, y5, y6, y7, y8, y9, - - - , y61, y62 and y63 of luminance data Y0 are allocated to high order bits (the bit 8 to the bit 15), and the pixel data b0, r0, b2, r2, b4, r4, b6, r6, b8, r8, - - - , r60, b62 and r62 (see FIGS. 2B and 2C) of the color difference data Cb0 and Cr0 corresponding to the block area of the luminance data Y0 are allocated to low order bits (the bit 0 to the bit 7).

Similarly, as 64 pieces (8 pixels×8 lines) of pixel data constituting a second block of data to be written, the pixel data y0, y1, y2, y3, y4, y5, y6, y7, y8, y9, - - - , y61, y62 and y63 of the luminance data Y1 are allocated to high order bits (the bit 8 to the bit 15), and the pixel data b0, r0, b2, r2, b4, r4, b6, r6, b8, r8, - - - , r60, b62 and r62 (see FIGS. 2B and 2C) of color difference data Cb0 and Cr0 corresponding to the block area of the luminance data Y1 are allocated to low order bits (the bit 0 to the bit 7).

Figure 9:
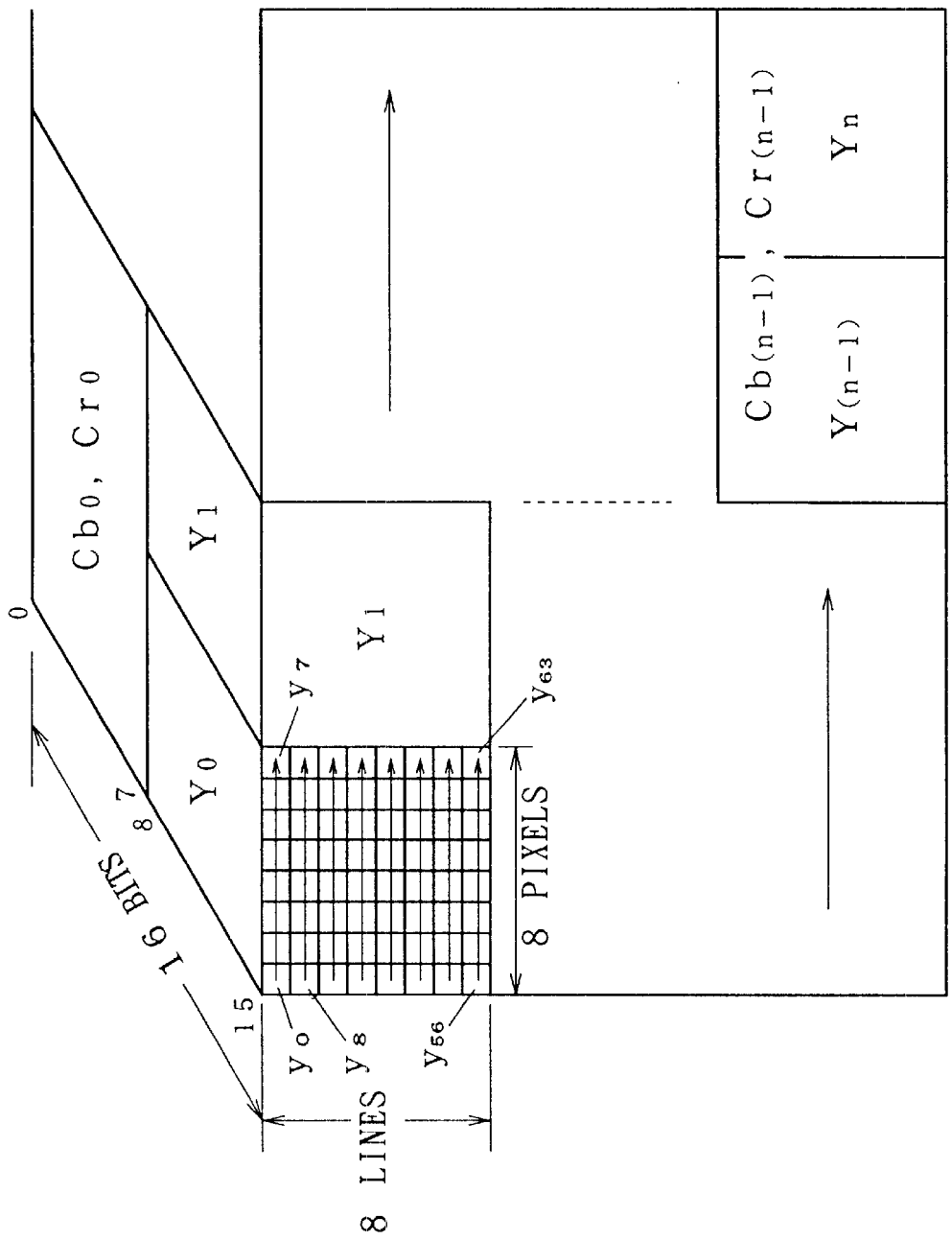
FIG. 9 shows the order of writing to the frame memory.

FIG. 9 shows the order of writing to the frame memory 111. As described above, as for the data to be written in units of block supplied from the buffer memory 113 to the frame memory 111, an address (RAS address) in the direction of lines is switched every 8 pieces of pixel data (16-bit data) and writing is performed. Therefore, as shown in FIG. 8C, time, Tad, for switching an address is required every time 8 pieces of pixel data are written. Time, Tst, shown in FIG. 8A denotes a period that the expansion processing of the compressing/expanding unit 115 is stopped. The time, Tst, is required in relation to the time, Tad and others.

After one frame of the luminance data Y and one frame of the color difference data Cb, Cr respectively are written to the frame memory 111 as described above, one frame of the luminance data Y and one frame of the color difference data Cb, Cr respectively are repeatedly read from the frame memory 111 under control by the memory controller 112, and they are supplied to the D/A converter 116 wherein RGB encoding processing and digital-to-analog conversion processing are applied to them.

The video encoder 117 generates a video signal SV, for example, according to NTSC method based upon chrominance signals of R, G and B output from the D/A converter 116 as an analog signal. An image based upon the video signal SV is displayed on the electronic view finder 118.

Next, the operation of the digital still camera 100 when a user gives an instruction to transfer data to an external equipment by operating the key input device 102 with a user will be described.

When user instructs the digital still camera to transfer the data to the external equipment, the PC card driver 114 executes operation to reproduce data in the PC card under control by the controller 101, one frame of the reproduced compressed image data is supplied to the compressing/expanding unit 115 wherein expansion processing is applied to the above data. The compressing/expanding unit 115 outputs two blocks of luminance data Y and one block of the color difference data Cb, Cr are repeatedly in the above order and are supplied to the connector 122 via the interface 121 as output to be transferred.

As described above, in the first preferred embodiment, if an instruction to reproduce is given, the buffer memory 113 generates 16-bit data to be written for two blocks in corresponding to two blocks of 8-bit luminance data Y and one block of 8-bit color difference data Cb, Cr respectively from the compressing/expanding unit 115. The buffer memory 113 supplies said 16-bit data to be written for two blocks to the frame memory 111 in units of block. Said 16-bit data to be written for two blocks is written to the frame memory 111. That is, in the first preferred embodiment, each of luminance data Y and color difference data Cb and Cr respectively from the compressing/expanding unit 115 is not written to the frame memory 111 in units of block but 16-bit data to be written composed of these luminance data Y and color difference data Cb and Cr is written to the frame memory 111 in units of block. Therefore, as the number of blocks to be written to the frame memory 111 decreases, total time required for switching an address in the direction of lines also decreases. Hereby, a period that the expansion processing of the compressing/expanding unit 115 stops to adjust time can be also reduced and time required for expanding image data can be reduced.

Next, a second embodiment of the present invention will be described. In the above first embodiment, the FIFO memory 131Y of the buffer memory 113 can store two blocks of luminance data Y and the FIFO memories 131B and 131R can respectively store one block of color difference data Cb and Cr. However, in the second preferred embodiment, a FIFO memory 131Y of a buffer memory 113 can store four blocks of luminance data Y and FIFO memories 131B and 131R can respectively store two blocks of the color difference data Cb, Cr.

Figure 10:
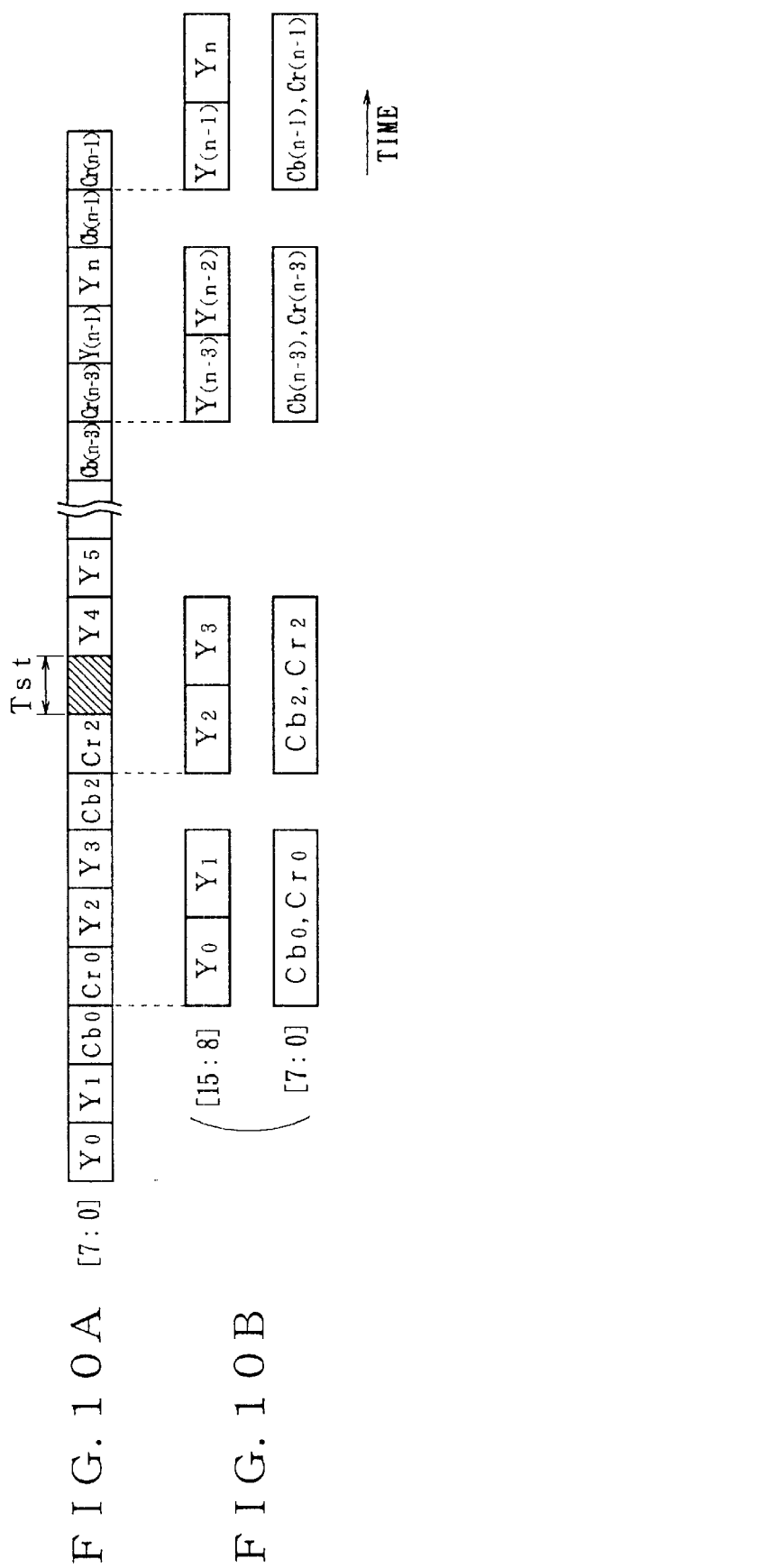
FIGS. 10A and 10B are views for explaining processing for writing to a frame memory in a second embodiment.

FIG. 10A shows the luminance data Y and the color difference data Cb, Cr respectively output from a compressing/expanding unit 115 and supplied to the buffer memory 113. In this case, the compressing/expanding unit 115 continuously outputs two sets one of which is composed of two blocks of the luminance data Y and one block of the color difference data Cb, Cr.

FIG. 10B shows data to be written supplied from the buffer memory 113 to a frame memory 111. In this case, two blocks of 16-bit data to be written are generated corresponding to two blocks of 8-bit luminance data Y and one block of 8-bit color difference data Cb, Cr. They are supplied from the buffer memory 113 to the frame memory 111 in units of block and are written to the frame memory 111. In this point, the second embodiment is similar to the first embodiment (see FIGS. 8B and 8C).

In the other points, the second embodiment is similar to the first embodiment. In the second embodiment, as two sets one of which is composed of two blocks of luminance data Y and one block of color difference data Cb, Cr are continuously output from the compressing/expanding unit 115, the total of a period, Tst, in which expansion processing in the compressing/expanding unit 115 is stopped can be reduced, compared with the total in the first embodiment and time required for expanding image data can be more reduced.

Next, a third preferred embodiment of the present invention will be described. In the above first embodiment, two blocks of 16-bit data to be written (each block is composed of 64 pieces (8 pixels×8 lines) of pixel data) are generated corresponding to two blocks of 8-bit luminance data Y and one block of 8-bit color difference data Cb, Cr, supplied from a buffer memory 113 to a frame memory 111 in units of block and are written to the frame memory 111.

However, in the third preferred embodiment, one block of 16-bit data to be written (a block is composed of 128 pieces (16 pixels×8 lines) of pixel data) is generated corresponding to two blocks of 8-bit luminance data Y and one block of 8-bit color difference data Cb and Cr, is supplied from the buffer memory 113 to the frame memory 111 in units of block and is written to the frame memory 111.

Figure 11:
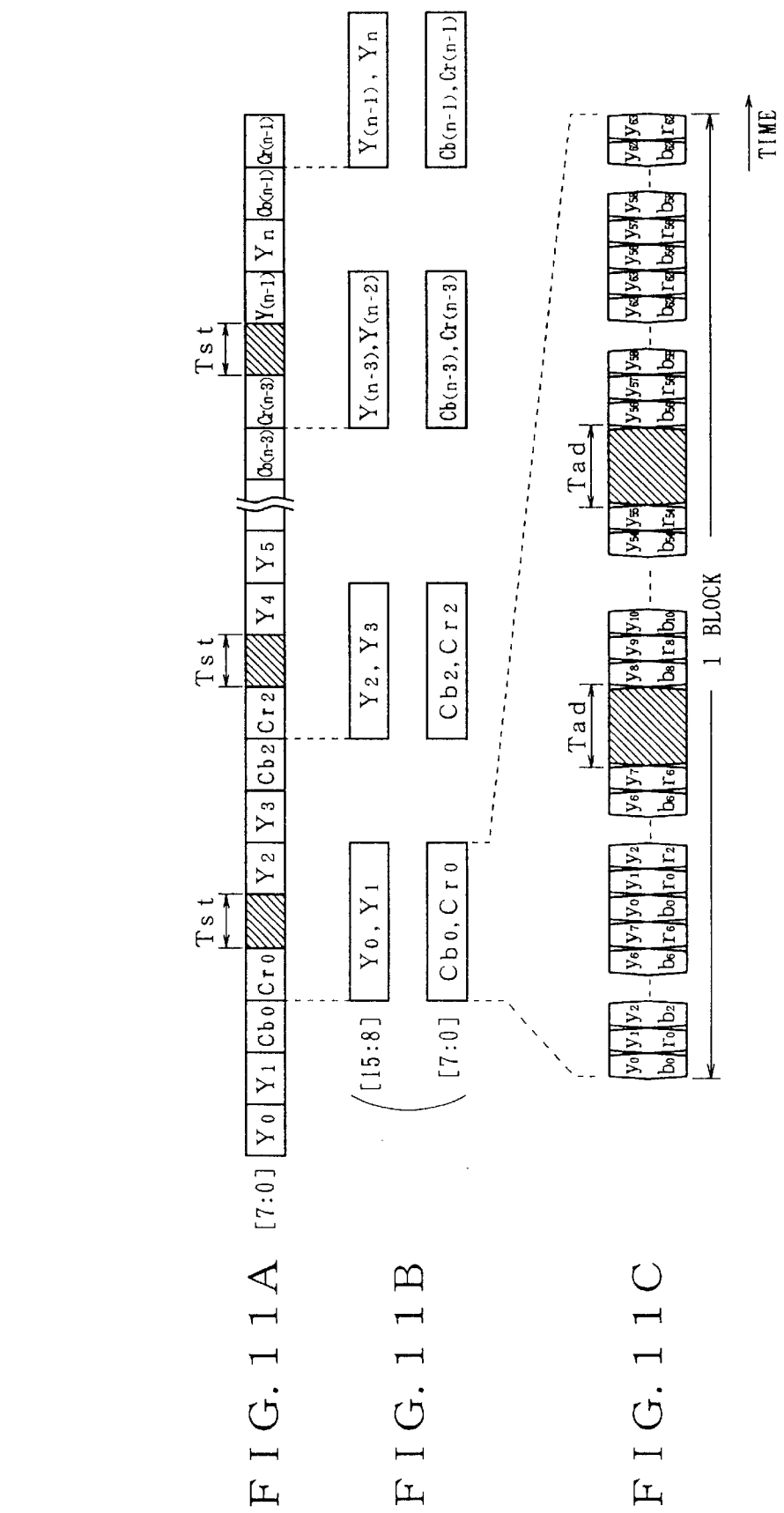
FIGS. 11A to 11C are views for explaining processing for writing to a frame memory in a third embodiment.

FIG. 11A shows the luminance data Y and the color difference data Cb and Cr respectively output from a compressing/expanding unit 115 and supplied to the buffer memory 113. "Y0, Y1, Y2, Y3, - - - " respectively denote one block of the luminance data Y. "Cb0, Cb2, - - - " respectively denote one block of the blue color difference data Cb. "Cr0, Cr2, - - - " respectively denote one block of the red color difference data Cr.

Each block of data of the luminance data Y and the color difference data Cb and Cr is composed of 64 pieces (8 pixels×8 lines) of pixel data. Pixel data for one block of the color difference data Cb, Cr corresponds to the area of two blocks of luminance data Y.

FIGS. 11B and 11C show data to be written supplied from the buffer memory 113 to the frame memory 111. As described above, one block of data to be written is generated corresponding to two blocks of luminance data Y and one block of color difference data Cb, Cr. For example, corresponding to luminance data Y0 and Y1 and color difference data Cb0 and Cr0, one block of data to be written is generated as follows.

As for 128 pieces (16 pixels×8 lines) of pixel data constituting one block of the data to be written, the pixel data y0, y1, y2, y3, y4, y5, y6, y7, y8, y9, - - - , y61, y62 and y63 of luminance data Y0 and Y1 are allocated to high order bits (a bit 8 to a bit 15), and the pixel data b0, r0, b2, r2, b4, r4, b6, r6, b8, r8, - - - , r60, b62 and r62 (see FIGS. 2B and 2C) of the color difference data Cb0 and Cr0 corresponding to the block area of the luminance data Y0 and Y1 are allocated to low order bits (a bit 0 to a bit 7).

Figure 12:
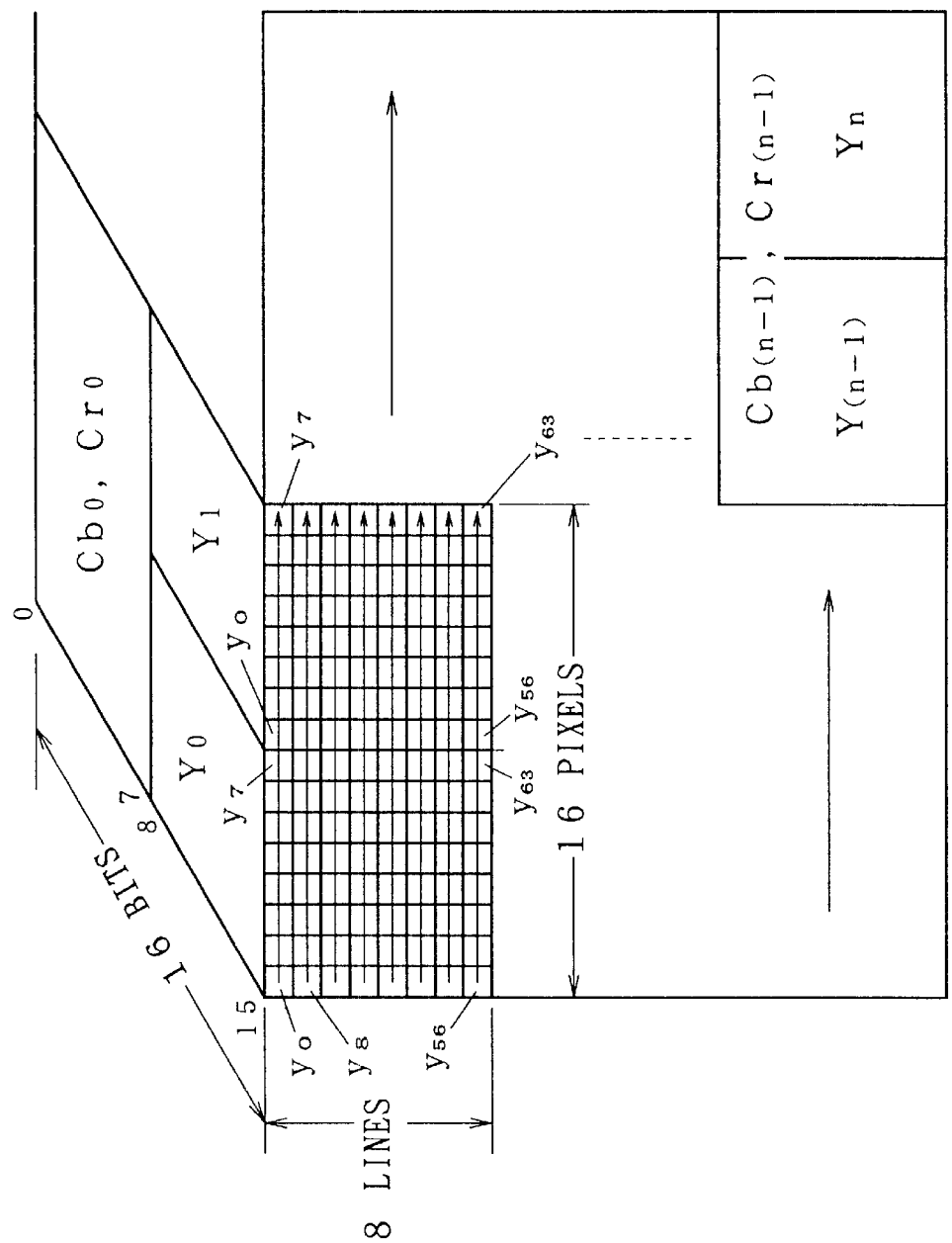
FIG. 12 is a view for showing the order of writing to the frame memory.

FIG. 12 shows the order of writing to the frame memory 111. As described above, as for the data to be written in units of block supplied from the buffer memory 113 to the frame memory 111, an address (RAS address) in the direction of lines is switched every 16 pieces of pixel data (16-bit data) and writing is performed. Therefore, as shown in FIG. 11C, time, Tad, for switching an address is required every time 16 pieces of pixel data are written. Time, Tst, shown in FIG. 11A, denotes a period in which the expansion processing of the compressing/expanding unit 115 is stopped. Said time, Tst is required in relation to the time, Tad and others.

In the other points, the third embodiment is similar to the first embodiment. In the third embodiment, one block of 16-bit data to be written (the block is composed of 128 pieces (16 pixels×8 lines) of pixel data) is generated corresponding to two blocks of the luminance data Y and one block of the color difference data Cb, Cr. As to the data to be written in units of block supplied from the buffer memory 113 to the frame memory 111, an address (RAS address) in the direction of lines is switched every 16 pieces of pixel data and writing is performed.

Therefore, the total of time, Tad, required for setting an address can be reduced up to a half, compared with a case that an address in the direction of lines is switched every 8 pieces of pixel data.

The total of a period, Tst, in which expansion processing in the compressing/expanding unit 115 is stopped can be reduced, compared with the total in the first embodiment and then time required for expanding image data can be more reduced.

Next, a fourth preferred embodiment of the present invention will be described.

In the above first embodiment, two blocks of 16-bit data to be written (each block is composed of 64 pieces (8 pixels×8 lines) of pixel data) are generated corresponding to two blocks of 8-bit luminance data Y and one block of 8-bit color difference data Cb, Cr. The data to be written is supplied from a buffer memory 113 to a frame memory 111 in units of block and are written to the frame memory 111. Each block of data to be written includes both of color difference data Cb and Cr. However, in the fourth preferred embodiment, a first block of data to be written includes only color difference data Cb and a second block of data to be written includes only color difference data Cr.

Figure 13:
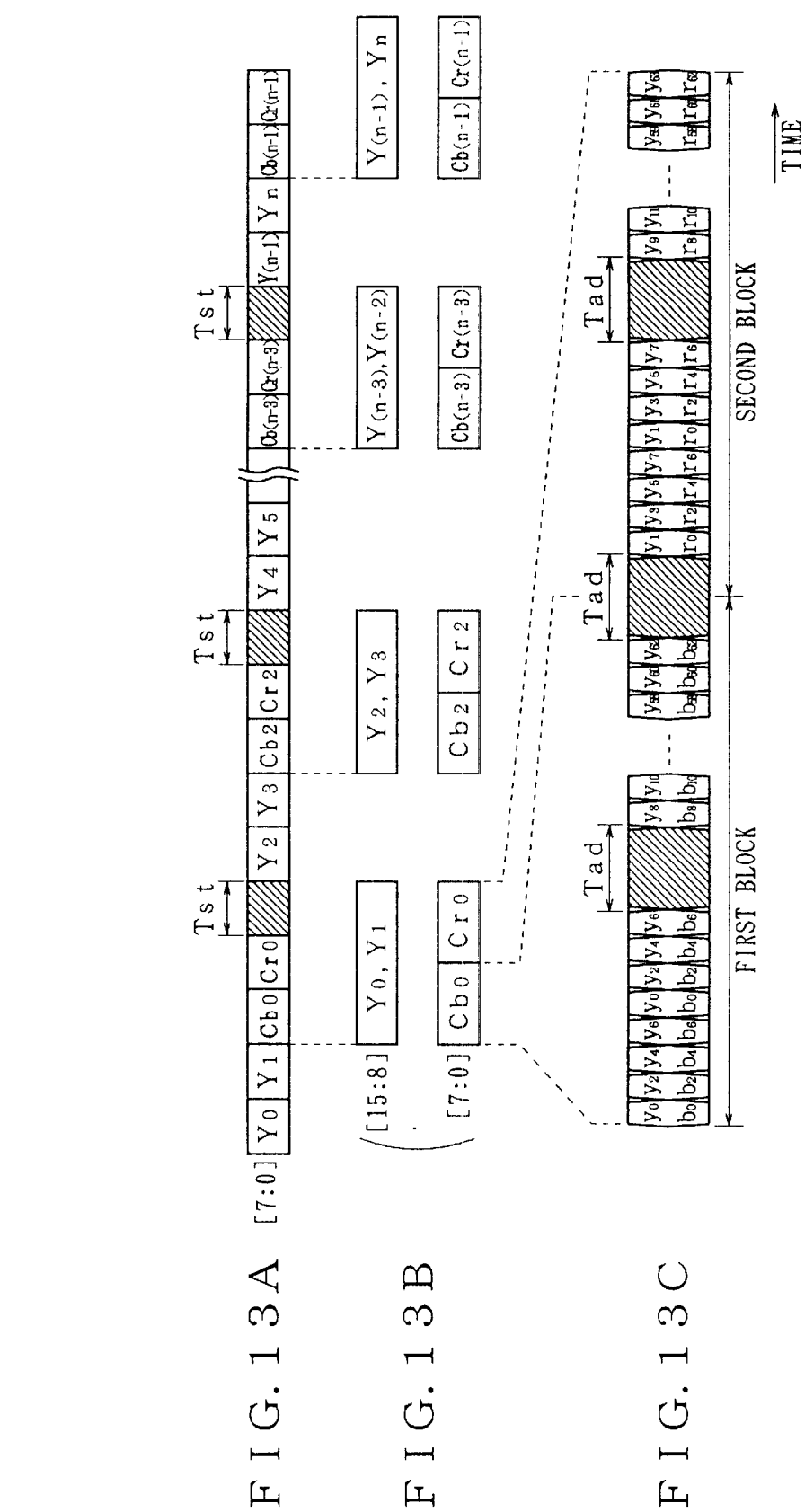
FIGS. 13A to 13C are views for explaining processing for writing to a frame memory in a fourth embodiment.

FIG. 13A shows the luminance data Y and the color difference data Cb and Cr respectively output from a compressing/expanding unit 115 and supplied to the buffer memory 113. "Y0, Y1, Y2, Y3, - - - " respectively denote one block of the luminance data Y. "Cb0, Cb2, - - - " respectively denote one block of the blue color difference data Cb. "Cr0, Cr2, - - - " respectively denote one block of the red color difference data Cr. Each block of data of the luminance data Y and the color difference data Cb and Cr is composed of 64 pieces (8 pixels×8 lines) of pixel data. The pixel data for one block of the color difference data Cb and Cr corresponds to the area of two blocks of luminance data Y.

FIGS. 13B and 13C show the data to be written supplied from the buffer memory 113 to the frame memory 111. As described above, two blocks of data to be written are generated corresponding to two blocks of luminance data Y and one block of color difference data Cb, Cr. For example, corresponding to luminance data Y0 and Y1 and color difference data Cb0 and Cr0, two blocks of the data to be written are generated as follows.

As for 64 pieces (8 pixels×8 lines) of pixel data constituting a first block of the data to be written, the even ordinal of pixel data y0, y2, y4, y6, y8, - - - and y62 of luminance data Y0 and Y1 are allocated to high order bits (a bit 8 to a bit 15) and the pixel data b0, b2, b4, b6, b8, - - - and b62 (see FIGS. 2B and 2C) respectively corresponding to the block area of the luminance data Y0 and Y1 of the color difference data Cb0 are allocated to low order bits (a bit 0 to a bit 7).

Similarly, as for 64 pieces (8 pixels×8 lines) of pixel data constituting a second block of the data to be written, the odd ordinal of pixel data y1, y3, y5, y7, y9, - - - , y61 and y63 of luminance data Y0 and Y1 are allocated to high order bits (the bit 8 to the bit 15) and the pixel data r0, r2, r4, r6, r8, r60 and r62 (see FIGS. 2B and 2C) respectively corresponding to the block area of the luminance data Y0 and Y1 of the color difference data Cr0 are allocated to low order bits (the bit 0 to the bit 7).

Figure 14:
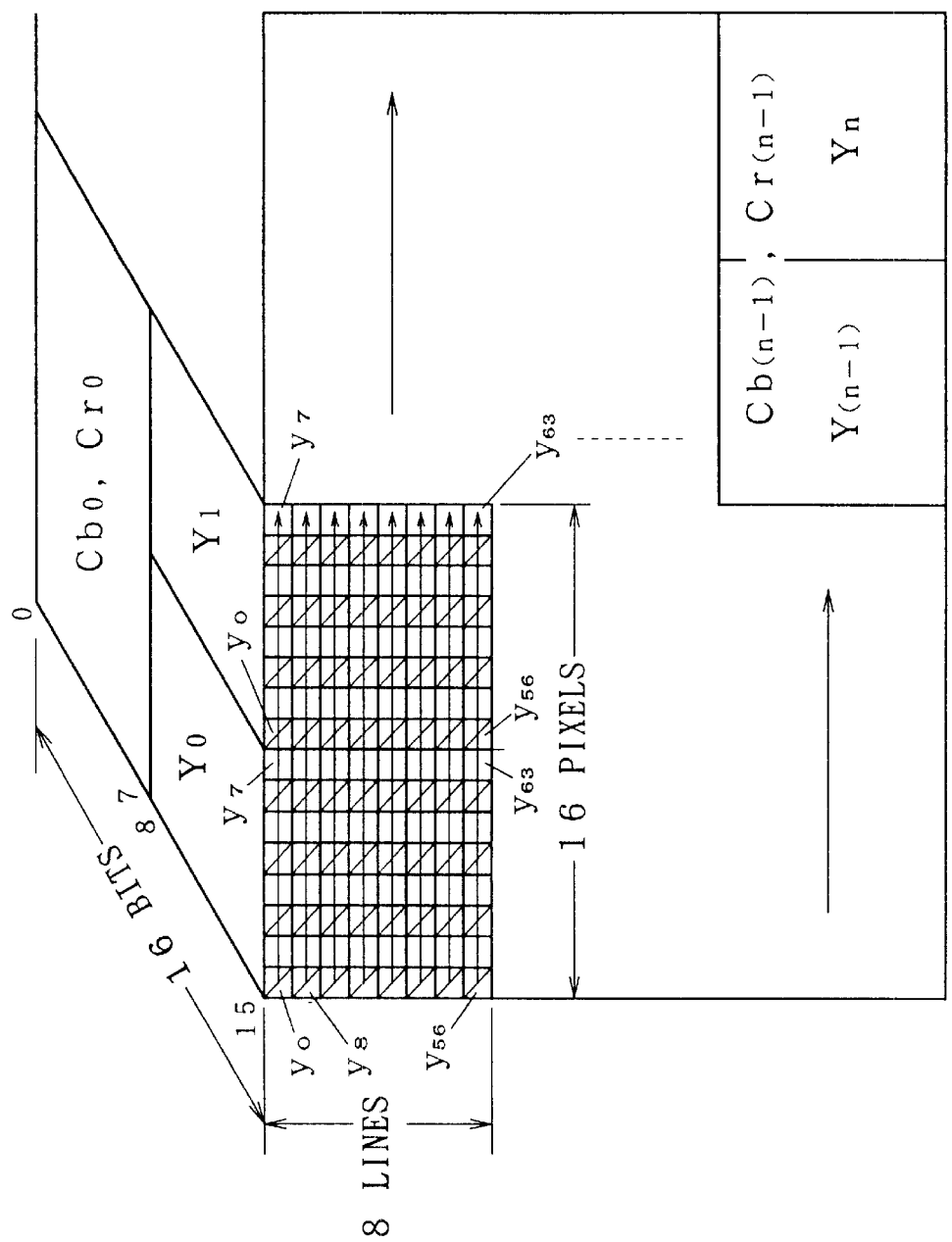
FIG. 14 is a view for showing the order of writing to the frame memory.

FIG. 14 shows the order of writing to the frame memory 111. As described above, as for the data to be written in units of block supplied from the buffer memory 113 to the frame memory 111, an address (RAS address) in the direction of lines is switched every 8 pieces of pixel data (16-bit data) and writing is performed. In this case, 8 pieces of pixel data constituting each line of the first block are written to even addresses (shown by oblique lines), while 8 pieces of pixel data constituting each line of the second block are written to odd addresses. As shown in FIG. 13C, time, Tad, for switching an address is required every time 8 pieces of pixel data are written. Time, Tst, shown in FIG. 13A, denotes a period in which the expansion processing of the compressing/expanding unit 115 is stopped. Said time, Tst, is required in relation to the time, Tad and others.

In the other points, the fourth embodiment is similar to the first embodiment. In the fourth embodiment, the first block of the data to be written including only color difference data Cb and the second block of the data to be written including only color difference data Cr are generated corresponding to two blocks of luminance data Y and one block of color difference data Cb, Cr. The data to be written is supplied from the buffer memory 113 to the frame memory 111 in units of block and is written to the frame memory 111.

Therefore, before the compressing/expanding unit 115 starts to output the color difference data Cr, the first block of the data to be written is generated and writing to the frame memory 111 can be started. The total of a period, Tst, in which expansion processing in the compressing/expanding unit 115 is stopped can be reduced, compared with the total in the first embodiment. Time required for expanding image data can be more reduced.

The fourth embodiment corresponds to the first embodiment. However, even if two sets one of which is composed of two blocks of the luminance data Y and one block of the color difference data Cb, Cr, are continuously output from the compressing/expanding unit 115 as in the above second embodiment, the first block of the data to be written including only the color difference data Cb and the second block of the data to be written including only color difference data Cr are generated corresponding to two blocks of the luminance data Y and one block of the color difference data Cb, Cr as in the fourth embodiment. These block of data are supplied from buffer memory 113 to the frame memory 111 in units of block and can be written to the frame memory 111.

Next, a fifth preferred embodiment of the present invention will be described. In the above fourth preferred embodiment, the FIFO memory 131Y of the buffer memory 113 can store two blocks of luminance data Y and the FIFO memories 131B and 131R can respectively store one block of color difference data Cb and Cr. However, in the fifth embodiment, the FIFO memory 131Y of a buffer memory 113 can store four blocks of luminance data Y and the FIFO memories 131B and 131R can respectively store one block of color difference data Cb and Cr.

FIG. 15A shows the luminance data Y and the color difference data Cb and Cr respectively output from a compressing/expanding unit 115 and supplied to the buffer memory 113. In this case, one set which is composed of two blocks of the luminance data Y and one block of the color difference data Cb, Cr is continuously output from the compressing/expanding unit 115 without stopping expansion processing.

FIG. 15B shows the data to be written supplied from the buffer memory 113 to the frame memory 111. In this case, a first block of the data to be written including only the color difference data Cb and a second block of the data to be written including only the color difference data Cr are generated corresponding to two blocks of 8-bit luminance data Y and one block of 8-bit color difference data Cb and Cr as in the above fourth embodiment. These block of data are supplied from the buffer memory 113 to the frame memory 111 in units of block and are written to the frame memory 111.

In the other points, the fifth embodiment is similar to the fourth embodiment. In the fifth embodiment, one set which is composed of two blocks of the luminance data Y and one block of the color difference data Cb, Cr is continuously output from the compressing/expanding unit 115 without stopping expansion processing.

Time required for expanding image data can be reduced, compared with the time in the fourth embodiment and then substantial speedup is enabled.

The above embodiments are based upon a video signal in "4 to 2 to 2" mode, however, the present invention can be similarly applied to a video signal in "4 to 1 to 1" mode and in "4 to 2 to 0" mode.

According to the present invention, a block of the data to be written composed of the luminance data and the color difference data respectively having first data length and having second data length equivalent to the double of the first data length, is generated, is supplied to the frame memory in units of block and is written to the frame memory. Therefore, as the number of blocks written to the frame memory can be reduced, total time required for switching an address in the direction of lines is also reduced. A period that expansion processing stops to adjust time can be reduced and time required for expanding image data can be reduced.

While the above is a complete description of the preferred embodiments of the invention, various alternatives, modifications and equivalents may be used. Therefore, the above description should not be taken as limiting the scope of the invention as defined by the appended claims.

What is claimed is:

1. A digital still camera that compresses a video signal acquired by photographing an object with a CCD imaging device, stores it in a storage element, reads said compressed video signal from the storage element and reproduces said video signal, comprising:

expansion processing means for performing expansion processing on said compressed video signal and outputting said video signal in units of block as luminance data and color difference data respectively having a first data length;

a frame memory having a second data length equivalent to the double of said first data length;

video data block generating means for generating a block of video data having said second data length by connecting the luminance data and the color difference data respectively having said first data length and output from said expansion processing means, in units of block; and writing means for writing a signal output from said video data block generating means to said frame memory in units of block of said video data, wherein said video data block generating means is provided with selectors for respectively selecting said luminance data and said color difference data, and connecting means for connecting the selected luminance data and color difference data.

2. A digital still camera according to claim 1, wherein:

a block of said video data includes luminance data composed of "$2^M$ pixels×$2^N$ lines", blue color difference data (B-Y) and red color difference data (R-Y) respectively composed of "$2^M$ pixels×$2^N$ lines" (M, N: 2 or larger integer).

3. A digital still camera according to claim 1, wherein:

said first data length is composed of 8 bits;

said second data length is composed of 16 bits; and said luminance data is allocated to high order 8 bits of said video data and said color difference data is allocated to low order 8 bits.

4. A digital still camera according to claim 1, wherein:

a block of said video data is a block composed of data constituted by "8 pixels×8 lines".

5. A digital still camera according to claim 1, wherein:

a block of said video data is a block composed of data constituted by "16 pixels×8 lines".

6. An image data processing unit, comprising:

an expansion processing means for expanding a compressed video signal as luminance data and color difference data respectively having a first data length and sequentially outputting the expanded video data in units of block;

a frame memory having a second data length equivalent to the double of said first data length; and data writing means for generating a block of data to be written having said second data length and writing the data to be written to said frame memory in units of block, said data to be written comprising the luminance data and the color difference data respectively having the first data length and output from said expansion processing means, wherein said video data block generating means is provided with selectors for respectively selecting said luminance data and said color difference data, and connecting means for connecting the selected luminance data and color difference data.

* * * * *